Feb. 5, 1935.  C. BRYNOLDT  1,989,845
LINING STRUCTURE
Filed April 19, 1933
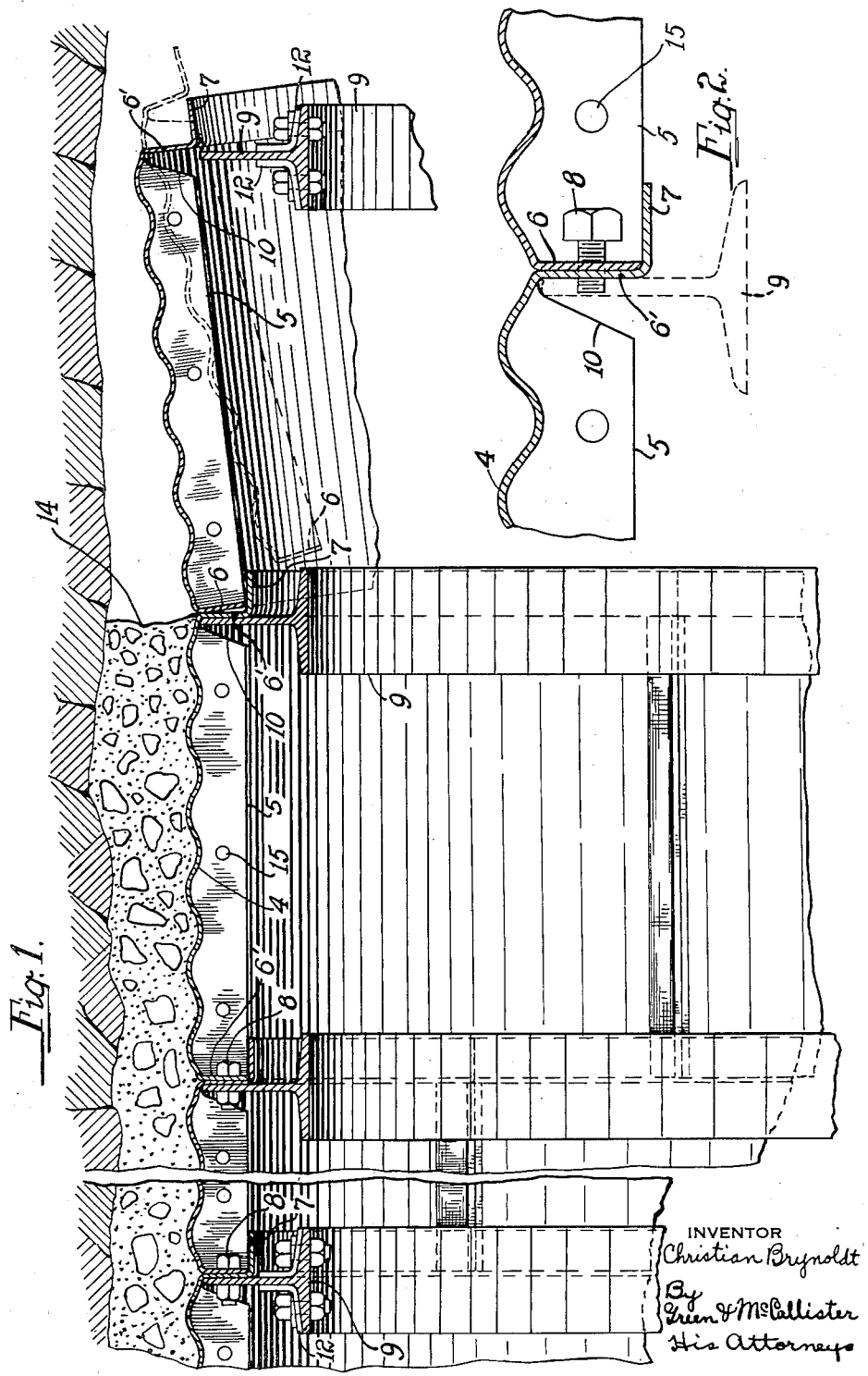

Patented Feb. 5, 1935

1,989,845

UNITED STATES PATENT OFFICE 1,989,845

LINING STRUCTURE

Christian Brynoldt, Pittsburgh, Pa., assignor to Blaw-Knox Company, a corporation of New Jersey Application April 19, 1933, Serial No. 666,849

2 Claims. (Cl. 61—45)

This invention relates generally to lining structures such as are employed in connection with tunnels and similar excavations. Such structures are usually made up of interconnected liner plates, although the plates may be associated with a reinforcing structure in the form of spaced ribs which are suitably secured to the plates and which usually extend circumferentially of the tunnel.

The present invention relates generally to such structures and also to the individual liner plates going into the make-up of such a structure.

An object of the invention is to produce a liner structure which is stronger in proportion to its weight and costs less than similar structures of equal or even less effectiveness, now in use and known to me.

A further object is to produce a simple and effective liner plate which because of its shape, contributes to the ease of assembly of the liner structure and thus contributes to a reduction in the cost of the entire structure.

These and other objects which will be made more apparent throughout the further description of the invention, are attained by means of a lining structure and individual plates such as are herein described and such as are illustrated in the drawing accompanying and forming a part hereof.

In the drawing:

Figure 1 is a fragmental longitudinal sectional view of a lining structure, shown in connection with an excavation such as a tunnel, and illustrates procedure which may be employed in assembling the plates into an interconnected structure; and Fig. 2 is a fragmentary sectional view on an enlarged scale and illustrates details of construction of two associated plates and a reinforcing rib.

In all lining structures, the plates employed as a part thereof should be so designed as to provide an economical distribution of material and consideration should be given to the fact that the plates are not only subjected to cross-bending and distorting strains occasioned by the back filling used in connection with such excavations as tunnels, but also act, in connection with the reinforcing structure, as columns. It is, therefore, important to so design the plate that the section modulus and the moment of inertia thereof is such as to contribute to the production of an effective and economical structure under the conditions encountered. It is, however, of primary importance to so design the plates that they can be readily and easily assembled in the lining structure and can be easily and effectively reinforced in case conditions develop which necessitate the use of reinforcing structures, or necessitate the use of stronger reinforcing structures than was originally installed as a part of the lining structure.

An important object of my invention is, therefore, the production of a lining plate which not only contributes to the effectiveness of the structure under the conditions encountered, but also simplifies the operation of installing, removing or replacing the reinforcing structure which may be employed, in connection with the interconnected plates, as a part of the lining structure.

This object is accomplished, in connection with the illustrated embodiment of my invention, by so forming each plate that it will effectively and economically resist strains encountered and may be connected to adjacent plates in such a way that the interconnecting bolts, or similar devices, are accessible and may be employed in securing a reinforcing structure, such as transversely extending ribs to the assembled plate structure without changing or disturbing the relative positioning of the plates in their assembled relationship.

In the illustrated embodiment of the invention, each plate is provided with a plate engaging extension at one end thereof, so arranged that the assembled plates are not only interconnected, by means of bolts or similar devices, but are interengaged in such a way that each plate forms, or may form a support for the edge of an adjacent plate during the assembling operation. This is an important feature of the invention and, as hereinafter pointed out, contributes to the ease of assembling the plates in the built-up structure.

Referring to the drawing; each individual plate includes a body portion 4, which may be corrugated as shown, although my invention does not involve the particular shape of the body portion thereof. The body portion is preferably flanged along its longitudinal and lateral edges. It will, of course, be understood that the body portions are preferably curved and that the radius of curvature thereof is varied to suit the form of the excavation in connection with which the plates are employed. From the foregoing it is also apparent that the longitudinal flanges 5 preferably extend in a radial direction with relation to the body portion, whereas the end flanges 6—6' may extend at right angles to the cylindrical plane defined by the curved body portion.

As heretofore pointed out, one of the features of the present invention is the provision of a plate engaging or supporting extension on each of the individual plates. In the illustrated embodiment, this extension consists of a longitudinally extending flange 7, which is formed as a part of the end flanges 6' and extends at right angles to that flange. With the arrangement illustrated, the plates may be assembled into an interconnected lining structure with or without a reinforcing structure. For this reason, the end flange 6' is preferably somewhat longer, in a radial direction, than the end flange 6 of an adjoining plate so that the two flanges 6 and 6' of adjacent plates may be abutted as shown in the drawing and may be secured together by interconnecting means such as bolts 8. The flange extension 7 is of sufficient length that it may form a support for one edge of an adjacent plate during the operation of assembling, and it may be so positioned as to form a support for the edge of the flange 6 of the adjacent plate even after the plates are in assembled and in permanent position. Thus it is apparent that the plates may be assembled to form an interconnected and intersupported lining structure whether or not a reinforcing structure is employed.

In Figure 2, I have shown in dotted lines a reinforcing rib 9—in the form of a T section—and I there illustrate the procedure which may be employed in assembling and connecting the reinforcing structure to the assembly of lining plates after the plates have been assembled and secured together by means of bolts or drift pins. As there shown, both longitudinal flanges 5 of each plate are notched, as indicated by the numeral 10, adjacent one end of each plate for the purpose of receiving the reinforcing rib. The depth, inclination, and shape of each notch 10 will depend upon the form of the reinforcing rib 9 employed. I prefer to employ a notch of the shape shown, which extends through the flange 5 and inclines back to the body portion 4 of the plate. Such a notch makes it possible to employ T-shaped ribs. The web is of sufficient depth to take care of the strains encountered, and to, at the same time provide sufficient space for the introduction of coupling bolts of adequate size.

Individual plates, such as illustrated, may be assembled and connected together, either temporarily or permanently before the reinforcing ribs are moved to place or are included as a part of the assembly. However, it is seen that the plates may be connected into a permanent structure without the use of reinforcing ribs. If after such a lining structure consisting only of plates, is assembled, conditions arise which indicate the desirability of employing reinforcing ribs, such ribs can be connected into the assembled plate structure without disassembling the plates, by merely removing the nuts from the connecting bolts (as shown in Figure 2), aligning the bolt holes of the rib with the bolt holes of the assembled plates, and then, inserting the connecting bolts through both sets of holes and again applying the nuts to the bolts and tightening the nuts. To facilitate this operation, the bolt holes in either the plates or the ribs may be somewhat elongated, circumferentially of the ribs or plate flanges. As seen from Fig. 2, a reinforcing rib 9 may be removed from the structure without a complete withdrawal of the bolt 8. That is, the rib 9 may be supported about the upper portion of plate 4 adjacent the end of notch 10 and moved off the end of bolt 8 and against the backwardly inclined edges of the notch. Thus, the backward inclination of the slots or notches 10 in the side walls 5 of the plates 4 makes possible a quick installation and removal of the reinforcing ribs 9.

Where reinforcing ribs are originally contemplated as a part of the lining structure, these ribs may be set in position, as shown in Figure 1, as a preliminary to assembling the plates. The operation of assembling the plates is then quite simple because each plate may be supported at one end on the plate engaging extension 7 of the next adjacent plate and at the other end on one of the reinforcing ribs 9. The operation of so locating a plate is diagrammatically illustrated in dotted and full lines at the right hand end of Figure 1, and consists essentially in first moving the forward edge of the plate—i. e., the edge carrying the flange 7—back of a supporting rib 9 and in such a position that the rear edge of the plate may be moved to position behind the flange 7 of the adjacent plate, which flange is already in position in the assembled structure, all as shown in dotted lines in Figure 1. The plate is then moved to the full line position in which the rear edge 6 is engaged and supported by the flange 7 of an adjacent plate and the notches 10 in the flanges 5 are in position to receive the web of the rib 9. The plate is then turned about its support on the flange 7 of the adjacent plate until its forward end is supported by the adjacent rib 9. Thus in the assembling operation, the plates are intersupported, and it is unnecessary to employ bolts or even drift pins for holding the plates in position, with the result that the operation of assembling the plates may be accomplished by two crews, one of which precedes the other and merely sets the plates in position, while the other follows with drift pins and bolts and permanently secures the plates together and to the reinforcing ribs 9.

From the foregoing it will be apparent that the operation of removing reinforcing ribs for the purpose of replacing them with other ribs is very simple and can be accomplished without disassembling the plates, since adjacent flanges of adjacent plates abut, and the ribs are secured to these abutting flanges. It is also apparent that the plate-engaging ledges or flanges 7 on the individual plates simplify the operation of assembling the individual plates into a lining structure even where reinforcing ribs are not employed as a part of the structure. There is an interengaging and intersupporting relation between each circumferential series of plate courses and the adjacent circumferential series of plates which simplifies the assembling operation. The latter, under ordinary conditions, can, as above pointed out, be accomplished with two crews, one following the other and permanently securing the assembled plates together.

Where it is necessary to splice the reinforcing ribs 9, the splicing may be accomplished without in any way interfering with the operation of connecting the plates and the ribs into the built-up structure and without increasing the work of assembling. As shown in the drawing, such splicing as is necessary can be accomplished by employing splice plates or angles 12, which may be bolted to the flanges only of the reinforcing T-bars 9. Thus it is apparent that by employing T-bars having webs of sufficient depth, an adequate splice may be provided without in any way interfering with the placing of the bolts 8 in the operation of interconnecting the separate parts of the structure. It is, of course, apparent that a splice plate may also be employed on the forward face of the flange of each T-bar and that bolts or rivets may also extend through the web of the bar and the adjacent legs of the angles 12 without interfering with the assembly operations.

Another and an important feature of this invention is that where reinforcing ribs are employed as a part of the lining structure, the connecting bolts 8 or equivalent devices may be practically relieved of shearing strains, since each lining plate may be, in effect, supported by two reinforcing ribs 9. As shown in Figure 1, this is accomplished by actually hooking one end of each plate over the adjacent rib 9 and by supporting the other end of the plate on the extension 7 of an adjacent plate. With such an arrangement an increased loading on the plates merely increases the frictional engagement between them and their supporting ribs, with the result that there is no tendency for the connecting bolts 8 or rivets to shear off under the resulting strains.

In Figure 1 of the drawing I have diagrammatically shown filling material 14, such as is ordinarily employed between the surface of the excavation and the lining structure and it will be apparent that plates embodying my invention and a structure such as disclosed by the drawing may be employed in connection with various types of excavations and that the lining structure as described may extend around the entire circumference of the tunnel or may be in the form of an arch supported at its ends by suitable sills constituting a part of the abutments of the arch.

The lateral flanges 5 of each plate are preferably provided with the usual bolt or rivet holes 15 for the purpose of interconnecting or securing adjacent plates together. There, as at the ends of the plates, flanges of adjacent plates are in abutting engagement with each other. It will also be apparent that the size and the curvature of the plates may be varied to suit conditions, and that in ordinary lining operations, the plates can be made light enough to be easily handled during the operation of assembling the structure. The usual concrete lining may be employed with the structure here disclosed.

While I have described what I now consider to be the preferred embodiment of my invention it will be apparent that various changes, modifications, additions and omissions may be made in connection with each plate and in connection with the assembled structure, without departing from the spirit and scope of my invention, as set forth by the appended claims.

What I claim is:

1. A lining structure for tunnels comprising a plurality of plates having flanges at the sides and at the front and rear ends thereof, the plates being disposed with the flanges thereof in abutting relation and secured together, the flange at the front end of each plate having a forwardly projecting portion on which the rear end of a contiguous plate may be supported in the process of erection of the lining, and the side flanges of said plates having notches disposed behind the front flanges but adjacent thereto, and reenforcing ribs extending into said notches and secured to the rear sides of the plate front flanges.

2. A lining plate, comprising a body portion having inwardly extending flanges at the sides and ends thereof, one of said end flanges having a plate supporting extension disposed parallel to the body portion, the two side flanges adjoining said flange with forwardly extending ledge being notched adjacent said flange to permit insertion of reinforcing ribs in said notches subsequent to the erection of the plate in the tunnel lining.

CHRISTIAN BRYNOLDT.